United States Patent [19]

Zajaczkowski et al.

[11] Patent Number: 5,670,260
[45] Date of Patent: Sep. 23, 1997

[54] RADIATION-CURED ADHESIVE FILM HAVING DIFFERENTIAL SURFACE ADHESION

[75] Inventors: Michael J. Zajaczkowski, Yoe; David A. Krupa, Mt. Wolf; Barbara A. Stutzman, Dover, all of Pa.

[73] Assignee: Adhesives Research, Inc., Glen Rock, Pa.

[21] Appl. No.: 426,662

[22] Filed: Apr. 21, 1995

[51] Int. Cl.$^6$ ............................... B32B 7/12; B32B 15/04
[52] U.S. Cl. ........................ 428/345; 428/212; 428/352; 428/354; 428/355 R; 428/355 EN; 428/355 CN; 428/355 AC; 428/355 N
[58] Field of Search ..................... 428/212, 355, 428/345, 352, 354, 355 EN, 355 CN, 355 AC, 355 N

[56] References Cited

U.S. PATENT DOCUMENTS

| | | | |
|---|---|---|---|
| Re. 32,249 | 9/1986 | Esmay | 428/40 |
| 3,328,194 | 6/1967 | Kasper. | |
| 4,111,769 | 9/1978 | Stueben. | |
| 4,181,752 | 1/1980 | Martens et al. | 427/54.1 |
| 4,286,047 | 8/1981 | Bennett et al. | 430/280 |
| 4,305,854 | 12/1981 | Rowe. | |
| 4,421,822 | 12/1983 | Levens | 428/343 |
| 4,442,258 | 4/1984 | Sunakawa et al. | 524/767 |
| 4,513,039 | 4/1985 | Esmay | 428/40 |
| 4,522,870 | 6/1985 | Esmay | 428/252 |
| 4,533,445 | 8/1985 | Orio. | |
| 4,554,324 | 11/1985 | Husman et al. | 525/301 |
| 4,599,265 | 7/1986 | Esmay | 428/355 |
| 4,656,077 | 4/1987 | Larimore et al. | 428/156 |
| 4,691,045 | 9/1987 | Fukuchi et al. | 560/185 |
| 4,714,655 | 12/1987 | Bordoloi et al. | 428/345 |
| 4,720,317 | 1/1988 | Kuroda et al. | 456/250 |
| 4,756,968 | 7/1988 | Ebe et al. | 428/343 |
| 4,814,215 | 3/1989 | Lautenschlaeger et al. | 428/40 |
| 4,818,610 | 4/1989 | Zimmerman et al. | 428/345 |
| 4,818,621 | 4/1989 | Kuroda et al. | 428/424.6 |
| 4,820,745 | 4/1989 | Muller et al. | 522/90 |
| 4,822,829 | 4/1989 | Muller et al. | 522/90 |
| 4,826,705 | 5/1989 | Drain et al. | 427/54.1 |
| 4,913,960 | 4/1990 | Kuroda et al. | 428/345 |
| 4,920,157 | 4/1990 | Schulz et al. | 522/96 |
| 4,965,117 | 10/1990 | Lautenschlaeger et al. | 428/182 |
| 4,968,558 | 11/1990 | Fisher et al. | 428/345 |
| 4,968,559 | 11/1990 | Kuroda et al. | 428/354 |
| 4,999,136 | 3/1991 | Su et al. | 252/512 |
| 4,999,242 | 3/1991 | Ishiwata et al. | 428/345 |
| 5,079,047 | 1/1992 | Bogaert et al. | 428/41 |
| 5,110,388 | 5/1992 | Komiyama et al. | 156/229 |
| 5,118,567 | 6/1992 | Komiyama et al. | 428/345 |
| 5,149,586 | 9/1992 | Ishiwata et al. | 428/345 |
| 5,151,454 | 9/1992 | Goto et al. | 522/93 |
| 5,187,007 | 2/1993 | Ebe et al. | 428/343 |
| 5,202,361 | 4/1993 | Zimmerman et al. | 522/120 |
| 5,204,379 | 4/1993 | Kubota et al. | 522/96 |
| 5,209,971 | 5/1993 | Babu et al. | 428/343 |
| 5,227,409 | 7/1993 | Mobley et al. | 521/167 |
| 5,281,473 | 1/1994 | Ishiwata et al. | 428/345 |
| 5,304,418 | 4/1994 | Akada et al. | 428/345 |
| 5,525,422 | 6/1996 | Spies et al. | 428/355 |

OTHER PUBLICATIONS

Glotfelter, Craig A., "Low Cost UV Curable Pressure Sensitive Adhesives", Sartomer, Radtech '94, pp. 1–9, May 1–5, Orlando, Florida.

Miller, Henry C., "Low Odor U.V. Pressure Sensitive Adhesives", Sartomer, Radtech '92 North America, pp. 1–8, Apr. 26–30, 1992 Boston, Mass.

International Search Report, PCT/US96/05316, Adhesives Research, Inc.

*Primary Examiner*—Ana Woodward

[57] ABSTRACT

A radiation-cured adhesive film having differential adhesion on opposing surfaces of the adhesive layer is provided. The film comprises a backing layer having coated thereon a radiation-cured adhesive copolymer layer, said copolymer comprised of one or more urethane oligomers A, optionally one or more B monomers, and a macromer C defined by the formula $X-(Y)_p-Z-R$ where X is a moiety copolymerizable with said urethane oligomer or capable of attachment to said copolymerized monomers A and B, Y is a divalent linking group, Z is a hydrophilic homo- or copolymeric moiety, R is a terminal group, and p is 0 or 1, said adhesive layer having a first surface portion in contact with said backing layer exhibiting an average peel adhesion value of at least 120 g/in and having a second opposing surface portion not in contact with said backing layer exhibiting an average peel adhesion value less than that exhibited by the first surface portion, and the ratio of the average peel adhesion values of said first and second surface portions being at least 2:1, respectively.

20 Claims, 1 Drawing Sheet

RADIATION-CURED ADHESIVE FILM HAVING DIFFERENTIAL SURFACE ADHESION

BACKGROUND OF THE PRESENT INVENTION

The present invention is directed to an adhesive film having differential adhesion on opposing portions of said adhesive layer. In particular, the present invention is directed to adhesive films used in the dicing semiconductor wafers to form chips.

Semiconductor wafers are normally produced in relatively large dimension (such as large diameter disks). The wafers are subsequently diced or cut into chips of much smaller size. Such wafers are generally made of silicon, gallium-arsenic, or similarly suitable material, and are extremely delicate by nature due both to the material employed and the fact that the wafer is very thin. The wafer is thus susceptible to breakage if unduly stressed during the manufacturing process or during the die cutting step to produce the chips.

The semiconductor wafer is adhesively bonded to a backing sheet during the dicing step. Once the wafer is pattern diced to produce a multitude of chips, each chip must be removed from the backing sheet for further processing. Exemplary backing sheets include polyvinyl chloride or polypropylene films. Generally, adhesives such as acrylate adhesives are used to bond the semiconductor wafer to the backing sheet. Such adhesives have been found, however, to be unacceptable for several reasons. First, the adhesives exhibit excessive adhesion with respect to the attached semiconductor wafer. Excessive adhesion is a disadvantage during the removal of the diced chips as the chip tends to resist separation from the backing sheet (resulting in cracking of the fragile chips). Also, even if successfully removed from the backing layer, the diced chips are subject to contamination by any adhesive residue which remains attached to the back of the chip. Given the need for non-contaminated chips, such adhesive contamination is unacceptable and a potential cause for rejection of the chip.

Several solutions to these problems have been attempted. The adhesive layer has been irradiated with ultraviolet radiation while in contact with the wafer and subsequent to the dicing step to reduce the adhesion of the adhesive layer to the diced wafer. Alternatively, in an attempt to lower the overall adhesive value of the adhesive layer attached to the wafer, it has been proposed to employ a backing sheet which contains a layer of the adhesive which has been pattern-cured by ultraviolet radiation.

Such solutions leave much to be desired. Due to incompatibility of the adhesive layer with (or lack of adhesion to) most polymeric backing materials, polyvinyl chloride is generally employed as the backing material. However, by way of disadvantage, polyvinyl chloride exhibits non-two dimensional stretch. This is a disadvantage in that uneven stress may be imparted to the attached semiconductor wafer during processing or removal of the diced chips from the backing sheet. It is thus desirable to use a polymeric backing material (such as polyurethane or low density polyethylene) which exhibits desirable two-way stretch characteristics in both the machine and transverse directions). Presently, the use of low density polyethylene is not favored due to the inability of conventional adhesives having the desired level of adhesion to bond adequately to the backing material. This is a disadvantage during the removal of the chips from the backing material as the degree of adhesion of the chip to the adhesive layer may exceed the degree of adhesion of the adhesive layer to the backing material. This may result in the chip remaining bonded to the adhesive layer when attempting to remove the diced chip from the backing sheet, with the adhesive being pulled from contact with the backing layer. An adhesive-backed chip undesirably results.

Pattern curing of the adhesive layer is also less than acceptable in that uncured portions of the adhesive layer may contaminate the semiconductor wafer and/or still resist removal of the chip depending upon the size of the chip and the area of the pattern-cured portion of the adhesive in contact with the chip.

Postcuring of the adhesive has been found undesirable as the adhesive level of the adhesive is frequently reduced beyond that necessary to maintain adequate adhesion with diced chips of small dimension (and correspondingly small surface area).

It has also been found that conventional acrylate adhesives may exhibit undesirable buildup of adhesion over time, thus enhancing the inability of the diced chip (upon long-term contact with the backing sheet) to be successfully removed from the backing sheet. Also, prior art dicing die bonding adhesives have exhibited unsatisfactory anti-static properties. It would be an advantage for the adhesive employed to exhibit anti-static properties due to the sensitivity of semiconductor chips to static charge.

Prior U.S. Pat. Nos. 4,720,317; 4,756,968; 4,818,621; 4,913,960; 4,968,559; 4,999,242; 5,149,586; 5,187,007; 5,281,473; and 5,304,418 are directed to semiconductor wafer dicing which are directed to the above attempts to address prior art problems but which are believed unsatisfactory for the reasons discussed above.

OBJECTS AND SUMMARY OF THE PRESENT INVENTION

It is accordingly one aspect of the present invention to provide an adhesive sheet for use in semiconductor wafer dicing which exhibits low adhesion with respect to the wafer.

It is accordingly another aspect of the present invention to provide an adhesive sheet for use in semiconductor wafer dicing which exhibits satisfactory adhesion with respect to a variety of polymeric backing sheets.

It is further an object of the present invention to provide an adhesive sheet for use in semiconductor wafer dicing which exhibits low buildup of adhesion values during use.

It is still further an object of the present invention to provide an adhesive sheet having an adhesive layer which exhibits desirably low adhesive values without the need for pattern-cured portions.

It is still further an object of the present invention to provide an adhesive sheet having an adhesive layer which exhibits desirably low adhesive values without the need for post-dicing curing of the adhesive.

It is still further an object of the present invention to provide an adhesive sheet having an adhesive layer having desirable differential levels of adhesion which adhesive also exhibits anti-static properties.

In accordance with the present invention, there is thus provided a radiation-cured adhesive film having differential adhesion on opposing surfaces of the adhesive layer. The film comprises a backing layer having coated thereon an adhesive copolymer layer, said copolymer being comprised of one or more urethane oligomers A, optionally one or more B monomers, and a macromer C defined by the formula X—(Y)$_p$—Z—R where X is a moiety copolymerizable with said urethane oligomer or capable of attachment to said copolymerized monomers A and B, Y is a divalent linking group, Z is a hydrophilic homo- or copolymeric moiety, R is a terminal group, and p is 0 or 1, said adhesive layer having a first surface portion in contact with said backing layer exhibiting an average peel adhesion value of at least 120 g/in and having a second opposing surface portion not in contact with said backing layer exhibiting an average peel adhesion value less than that exhibited by the first surface portion, and the ratio of the average peel adhesion values of said first and second surface portions being at least 2:1, respectively.

DETAILED DESCRIPTION OF THE INVENTION

Figure 1:
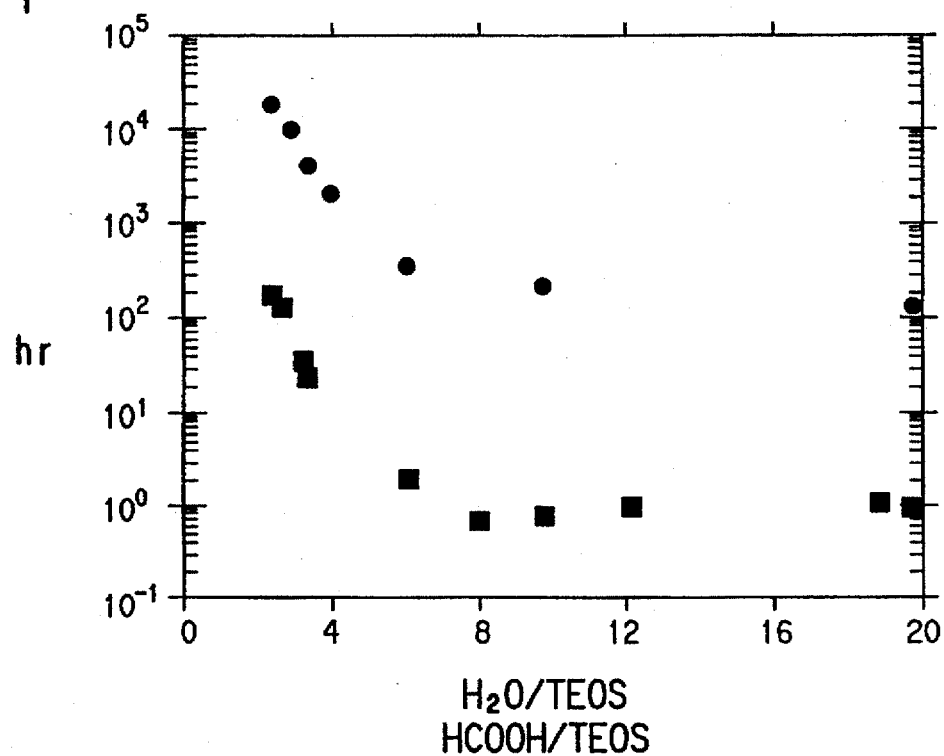
Figure 2:
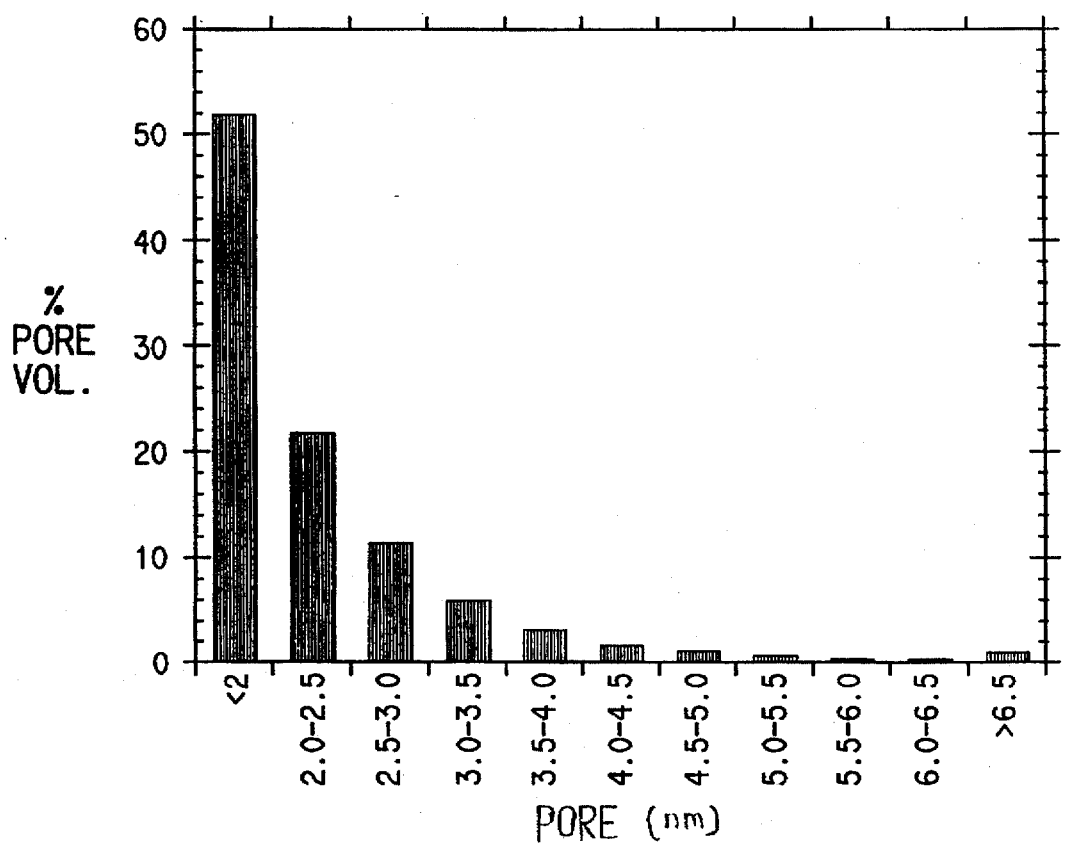

The adhesive of the present invention is a copolymer comprised of one or more urethane oligomers A, optionally one or more B monomers, and one or more macromers (as defined).

A variety of urethane oligomers may be employed. The urethane oligomer may be obtained, for example, by reacting terminal isocyanate urethane prepolymers obtained by the reaction of polyester or polyether type polyol compounds, with polyvalent isocyanate compounds. For example, compounds such as 2,4-toluene diisocyanate, 2,6-toluene diisocyanate, 1,4-xylylene diisocyanate, and diphenylmethane 4,4'-diisocyanate may be reacted with 2-hydroxyethyl (meth)acrylate, 2-hydroxypropyl (meth)acrylate, polyethylene glycol (meth)acrylate, etc. Preferably, the molecular weight of the urethane oligomer is at least 3000, and preferably within the range of from about 3,000 to 10,000.

A preferred urethane oligomer is a difunctional aliphatic urethane acrylate oligomer available commercially from Sartomer Company, Inc. of Exton, Pa. under the trade designation CN 966 H90.

The macromer C forms polymeric sidechains on the graft copolymer. The macromer may be represented by the formula X—(Y)$_p$—Z—R wherein X is a moiety copolymerizable with monomers A and B or, in the alternative, capable of attachment to polymerized monomers A and B, Y is a divalent linking group, Z is a hydrophilic homo- or polymeric moiety essentially unreactive at copolymerization conditions, R is a terminal group, and p is 0 or 1. One or more different macromers may be employed.

More specifically, the X moiety is an unsaturated polymerizable moiety. The composition of the X moiety is not critical. The X moiety may be, for example, when intended to be copolymerizable with monomers A and B, simply a vinyl group of the formula CHR=CR$^1$— where R is hydrogen or COOH, and R$^1$ is hydrogen or alkyl (such as methyl). Other exemplary X moieties include but are not limited to methacryloyl, maleoyl, itaconoyl, crotonoyl, unsaturated urethane moiety, methacrylamido and moieties of the formula CH$_2$=CHCH$_2$O—.

The X moiety may also comprise an amine or alcohol moiety (such as a monohydroxyl or monoamine moiety) which permits attachment of the macromer to a suitable functionality on previously-polymerized monomers A and B. For instance, the hydroxyl moiety can serve as a terminal reactive group by reaction with suitable moieties on the polymer backbone resulting from the use of monomers such as isocyanate-substituted (meth) acrylic acid, (meth)acrylic acid anhydride, etc.

The Y linking group employed is also not critical. A preferred Y divalent linking group is —C(O)—, or a linking group which incorporates such a moiety.

Additional Y linking groups which may be employed in connection with the present invention include but are not limited to the following moieties:

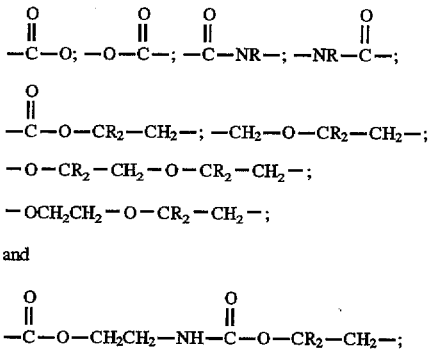

and $$-\overset{O}{\underset{\|}{C}}-O-CH_2CH_2-NH-\overset{O}{\underset{\|}{C}}-O-CR_2-CH_2-;$$

where R is hydrogen, alkyl or phenyl. The presence of the Y linking group is optional in the event the macromer includes a functionality which enables the Z moiety to react with the X moiety. As the incorporation of macromolecular moieties in copolymers is well understood by those skilled in the art, the choice of a suitable X and Y moiety for use in the present invention may be readily made upon practice of the present invention. See, for example, the discussion in U.S. Pat. Nos. 3,786,116; 3,832,423; 3,842,058; 3,842,059; 3,842,146; and 4,554,324, herein incorporated by reference.

The hydrophilic Z moiety is preferably selected from the group consisting of (but not limited to) a polypropylene or polyethylene oxide radical, a polyethyloxazoline radical such as a radical of poly(2-ethyl-2-oxazoline), polyacrylic acid radical, polyvinyl alcohol radical, polyvinylpyrrolidone radical, polyvinyl caprolactam radical, polymethylvinyl ether radical or mixtures thereof.

Exemplary C macromers formed from such components include but are not limited to ethoxylated or propoxylated hydroxy(lower)alkyl meth(acrylate), polymethylvinyl ether mono(meth)acrylate, and ethoxylated or propoxylated nonyl-phenol acrylate. The molecular weight of the macromer used in the present invention is not critical but will generally range from about 300 to about 50,000, and preferably from about 300 to 3,000.

By way of example, the macromer C may be represented by the formula:

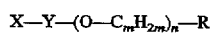

wherein X and Y are as defined above and R represents a terminal group; and in which m is an integer of from 2 to 6 and n is an integer of from 5 to 300.

By way of further example, the hydrophilic Z moiety may be a copolymer of hydrophilic and hydrophobic monomers, with any copolymerized hydrophobic portion being present in an amount by weight which is less than the hydrophilic portion. More specifically, any non-hydrophilic monomer portion of the Z moiety is present in an amount of less than 50 percent by weight based on the weight of the Z moiety, and preferably less than 30 percent by weight.

The macromer C may employ a variety of terminal groups R. While the terminal group may typically be OH or C$_{1-5}$ alkyl, it may be desirable to select a terminal group based on the functional character of the terminal group. For instance, suitable terminal groups include but are not limited to (1) acid/ionic groups such as carboxyl, phosphate or sulfate groups, (2) hydrophobic groups such as lower alkyl, phenyl or substituted phenyl, and (3) hydrophilic groups such as hydroxyl or amine groups.

Suitable macromers include an ethoxylated nonyl-phenol acrylate represented by the formula:

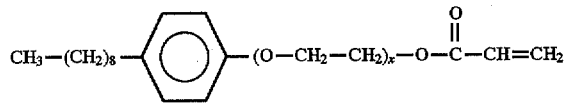

marketed by Sartomer under the trade designation CD-504, as well as an ethoxylated or propoxylated hydroxy(lower) alkyl (meth)acrylate represented by the formula:

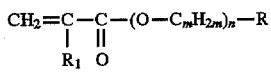

wherein $R_1$ is hydrogen or $C_{1-5}$ alkyl and R is a terminal group. Preferably, m is 2 or 3 and n is 5 to 30, and R is OH or $C_{1-5}$ alkyl.

Optionally, one or more polymerizable B monomers may be incorporated in the copolymer which B monomer(s) is copolymerizable with the A monomer. Such additional B monomer(s) may be either hydrophilic or hydrophobic.

Exemplary B monomers include vinyl monomers having at least one nitrogen atom. Such monomers (each of which exhibit a $T_g$ of >20° C.) include but are not limited to N-mono-substituted acrylamides such as acrylamide, methacrylamide, N-methylacrylamide, N-ethylacrylamide, N-methylolacrylamide, N-hydroxyethylacrylamide, and diacetone acrylamide; N,N-disubstituted acrylamides such as N,N-dimethylacrylamide, N,N-diethylacrylamide, N-ethyl-N-aminoethyl acrylamide, N-ethyl-N-hydroxyethylacrylamide, N,N-dimethylolacrylamide, and N,N-dihydroxyethylacrylamide, etc.

Other B monomers include, for example, various vinyl monomers such as acrylic and methacrylic acid, methoxyethyl acrylate or methacrylate, ethyoxyethyl acrylate or methacrylate, methyl acrylate or methacrylate, ethyl acrylate or methacrylate, propyl acrylate or methacrylate, 2,2 (ethoxyethoxy)ethyl acrylate, glycerol acrylate or methacrylate, hydroxyethyl methacrylate, hydroxypropyl methacrylate, vinyl pyrrolidone and vinyl caprolactam (each of which also exhibit a $T_g$ of >20° C.). Monomeric acrylic or methacrylic acid esters of a non-tertiary alcohol having from 4–12 carbon atoms on average, and preferably from 4–8 carbon atoms, such as n-butyl acrylate or methacrylate, etc. are also suitable B monomers, with such monomers exhibiting a $T_g$ of <0° C.

By way of the overall composition of the copolymer, the oligomer is preferably present in an amount of from 30 to 65 percent by weight, most preferably at least 45 percent by weight, the B monomer is preferably present in an amount of from 0 to 10 percent by weight, and the C macromer is preferably present in an amount of from 35 to 70 percent by weight, based on the total weight of the respective components in the copolymer.

The weight ratio of macromer to oligomer preferably ranges from 30:70 to 70:30, with it being further preferred that the weight ratio of macromer to oligomer in the copolymer is 50:50.

The radiation-curable composition of the present invention is preferably prepared by mixing the oligomers, the macromer(s) and the optional B monomer followed by addition of the photoinitiator and a photocrosslinker (if used).

The resulting composition is then coated onto a flexible carrier web using any conventional means such as roller coating, dip coating, knife coating, or extrusion coating and subsequently polymerized or cured.

In order to provide the requisite differential adhesion desired, the composition coated on a backing layer may be cured in air by irradiating the exposed surface of the composition. In the present invention the term "radiation" means light rays, such as ultraviolet rays, or ionizing radiations such as an electron beam. Preferably, ultraviolet lamps are used which emit UV light in the wavelength range absorbed by the particular photoinitiator used. Several different lamps which are commercially available may be used. These include medium pressure mercury lamps and low intensity fluorescent lamps, each having various emission spectra and emission maxima between 280 and 400 nanometers. Commercially available fluorescent black lights with a maxima at 351 nanometers and 90% of the emissions between 300 and 400 nanometers (nm) may be utilized. In general, the total radiation dose should be between about 400–600 milliJoules/cm². It is preferable that at least about 75 percent of the radiation be between 300 and 400 nm.

If the composition is to be cured by exposure to nonionizing radiation, such as ultraviolet radiation, then a photoinitiator is also present in the composition. The photoinitiator, if present, is employed at a concentration of from about 0.1 to 10 weight percent, preferably from 0.5 to 5 weight percent based on the total weight of the radiation curable pressure sensitive adhesive composition.

The photoinitiators which may be used are well known to those skilled in the art. Such photoinitiators include but are not limited to 2,2-diethoxyacetophenone, 2,2-dimethoxyphenoxyacetophenone, 2- or 3- or 4-bromoacetophenone, 3- or 4-allylacetophenone, 2-acetonaphthone, benzaldehyde, benzoin, the allyl benzoin ethers, benzophenone, benzoquinone, 1-chloroanthraquinone, Michler's Ketone, p-methoxybenzophenone, dibenzosuberone, 4,4-dichlorobenzophenone, 1,3-diphenyl-2-propanone, fluorenone, 1,4-naphthyl-phenylketone, 2,3-pentanedione, propiophenone, chlorothioxanthone, 2-methylthioxanthone xanthone or mixtures thereof.

Any polymeric film may be usable as the backing film and need not be permeable or transparent to the ultraviolet light. Exemplary polymeric films include polyvinyl chloride, vinyl chloride-vinylidene chloride copolymer, vinyl chloride-vinyl acetate copolymer, vinyl chloride-acrylic acid copolymer, polyvinylidene chloride, polyolefins such as polyethylene or polypropylene, polymethyl methacrylate, polyvinyl alcohol, polyamide, polyimide, polyamideimide, polyesters such as polyethylene terephthalate, polycarbonate, polyurethane and cellulose acetate.

The backing film desirably has a thickness on the order of 10 to 1000 μm.

Although there is no particular limit to the thickness of the radiation-curable copolymer on the substrate, the thickness of the copolymer is generally 2 to 200 μm.

As a result of the radiation polymerization method employed, an adhesive film is produced which contains an adhesive layer exhibiting differing degrees of peel adhesion on opposing first and second portions or surfaces of the adhesive film. For example, a first surface of the adhesive (i.e., the "non-inerted" portion contacting the backing sheet) exhibits an average peel adhesion value of at least 120 g/in, and preferably at least 150 g/in, as determined by PSTC 1. By contrast, the "inerted" second or opposing surface of the adhesive not in contact with the backing sheet (but which has been cured in contact with air) exhibits an average peel adhesion value less than that of the first surface, and preferably from 15–120 g/in, as measured by PSTC 1. The ratio of the average peel adhesion value of the "non-inerted" first surface of the adhesive in contact with the backing sheet to that of the opposing "inerted" second surface of the adhesive layer is at least 2:1. Preferably, the ratio of average peel adhesion value of the first surface to the second surface is from 2:1 to 6:1.

The adhesive character of the resulting film may be further modified by the addition of a conventional tackifier resin in the curable adhesive blend. Such a resin is present in an amount of from 0 to 10 percent by weight, based on the total weight of the curable blend. By way of example, a suitable tackifier resin that may be employed is Norsolene S series tackifier resin available from Sartomer. The use of tackifier resins to modify the adhesive character of an adhesive film is conventional and with the skill of the routineer in the art.

This difference in average peel adhesion value provides several advantages. First, the "inerted" second surface of the adhesive layer exhibits sufficiently minimal levels of adhesion to permit the adhesive layer to bond to an adjacent surface and yet still be easily removed from contact with the surface. This provides a real benefit in the area of semiconductor processing as it permits die chips to be easily removed from contact with the adhesive film, thus minimizing potential damage to the chips during removal. Secondly, the fact that the "non-inerted" first surface of the adhesive layer exhibits greater adhesion helps avoid separation of the adhesive layer from the backing sheet to which the adhesive is applied. This minimizes contamination of the diced chip from the adhesive layer.

The adhesive layer of the present invention provides additional advantages. Due to the hydrophilic character of the macromer, the adhesive may exhibit surface resistivity values which enable the adhesive layer to be static dissipative. This is a significant advantage in semiconductor processing. More specifically, a static dissipative material is classified by industry as one which exhibits a surface resistivity of at least $10^5$ ohms/square or $10^3$ ohm-cm volume resistivity, but less than $10^{12}$ ohms/square surface resistivity or $10^{10}$ ohm-cm volume resistivity. These definitions are found in EOS/ESD glossary of terms, published by the EOS/ESD Association, August, 1987, herein incorporated by reference. Volume and surface resistivity values are determined by ASTM test procedures D257. It has been found that the adhesive copolymers of the present invention may exhibit a surface resistivity on the order of $10^{11}$–$10^{15}$ ohms/square if sufficient hydrophilic macromer is present.

Also, the adhesive exhibits negligible adhesive buildup with time. This is significant as adhesive buildup negates the advantages attendant to initially low adhesive values.

Adhesive films having opposing surfaces of differing levels of adhesion are known. See, for example, U.S. Pat. No. 4,656,077. However, the prior art has not heretofore provided an adhesive film having the composition of the present invention which provides the desired combination of differential adhesion, anti-static properties and low adhesion buildup.

The invention will be discussed in conjunction with the following examples, which are intended to be merely illustrative of the present invention and not intended to in any way limit the scope of the invention.

EXAMPLE 1

An exemplary radiation-curable composition of the present invention was prepared by use of the following components:

| | |
|---|---|
| Difunctional aliphatic urethane acrylate oligomer blended with 10% 2,2(ethoxyethoxy)ethyl acrylate (B monomer) | 53.33% by wt |
| Ethoxylated nonyl-phenol acrylate (macromer) | 42.67 |
| Norsolene S series tackifier resin | 3.00 |
| Photoinitiator catalyst | 1.00 |
| | 100.00 % by wt |

Note: The urethane/B monomer blend is available from Sartomer under the designation CN 966 H90
The nonyl-phenol acrylate is available from Sartomer under the designation CD-504
The tackifier resin is available from Sartomer under the designation S-115
The photoinitiator is available from Ciba Geigy under the designation Irgacure 184

By way of procedure, the urethane oligomer/B monomer blend (CN 966 H90) and the nonyl-phenol acrylate (CD-504) are admixed until the temperature of the mixture is approximately 160° F. The tackifier resin (S-115) as a fine powder is added incrementally to ensure total dissolution. The resulting mixture was then filtered using a 100 micron filter. The filtered mixture is then cooled to 80°–90° F., and the photoinitiator catalyst added.

Additional samples of exemplary radiation-curable compositions of the present invention were prepared in the same manner as in Example 1 using the following compositions:

EXAMPLE 2

| | |
|---|---|
| Difunctional aliphatic urethane acrylate oligomer blended with 10% 2,2(ethoxyethoxy)ethyl acrylate (B monomer) | 53.88% by wt |
| Ethoxylated nonyl-phenol acrylate (macromer) | 43.12 |
| Norsolene tackifier resin | 2.00 |
| Photoinitiator catalyst | 1.00 |
| | 100.00% by wt |

EXAMPLE 3

| | |
|---|---|
| Difunctional aliphatic urethane acrylate oligomer blended with 10% 2,2(ethoxyethoxy)ethyl acrylate (B monomer) | 53.33% by wt |
| Ethoxylated nonyl-phenol acrylate (macromer) | 42.67 |
| Norsolene tackifier resin | 3.00 |
| Photoinitiator catalyst | 1.00 |
| | 100.00% by wt |

EXAMPLE 4

| | |
|---|---|
| Difunctional aliphatic urethane acrylate oligomer blended with 10% 2,2(ethoxyethoxy)ethyl acrylate (B monomer) | 52.22% by wt |
| Ethoxylated nonyl-phenol acrylate (macromer) | 41.78 |
| Norsolene tackifier resin | 5.00 |
| Photoinitiator catalyst | 1.00 |
| | 100.00% by wt |

EXAMPLE 5

| | |
|---|---|
| Aromatic urethane acrylate oligomer blended with 15% 2,2(ethoxyethoxy)ethyl acrylate (B monomer) | 49.43% by wt |

| | -continued | |
|---|---|---|
| Ethoxylated nonyl-phenol acrylate (macromer) | | 39.57 |
| HEMA-10 (macromer) | | 5.00 |
| Norsolene tackifier resin | | 5.00 |
| Photoinitiator catalyst | | 1.00 |
| | | 100.00% by wt |

Note: HEMA-10 is 10 mole ethoxylate of hydroxy ethyl methacrylate (produced by BIMAX, Inc.)

A suitable backing sheet (polyester release liner) was coated with a thin layer of each of the compositions of Examples 1–5 (1.7–1.9 ml in thickness) and passed under an ultraviolet lamp emitting radiation within the range of from 350–400 nm. The lamp was mounted above the coated sheet at a distance of 4 inches. The lamp was fitted with a reflector assembly to direct radiation energy downwardly onto the coated sheet to produce an essentially uniform light intensity profile on the coated sheet as the sheet moved beneath the lamp at a speed of 4.7 ft/min to form the adhesive copolymer of the present invention. The uppermost surface of the coated layer (not in contact with the backing sheet) was in contact with air during the irradiation step.

The surface resistivity and peel adhesion values for the opposing surface portions of the adhesive copolymer layer formed on the backing sheet were then determined. Peel adhesion values were determined for both the non-inerted surface of the adhesive in contact with the backing sheet as well as the inerted surface of the adhesive which was exposed to air during the irradiation step. The resulting surface resistivity and peel adhesion values of the adhesive films of Examples 1–5 are summarized in Table I below:

TABLE I

| | | Peel Adhesion Inerted Surface | | Peel Adhesion Non-Inerted Surface | |
|---|---|---|---|---|---|
| Example | Surface Resistivity | Peak | Average | Peak | Average |
| 1 | >1 × 10$^{12}$ | 33.1 | 30.9 | 252.7 | 148.1 |
| 2 | >1 × 10$^{12}$ | 24.7 | 22.8 | 181.5 | 155.6 |
| 3 | >1 × 10$^{12}$ | 33.1 | 30.9 | 378.8 | 264.5 |
| 4 | >1 × 10$^{12}$ | 32.6 | 31.1 | 326.4 | 241.5 |
| 5 | 1 × 10$^{11}$ | 16.8 | 15.1 | 91.4 | 83.8 |

Note: Surface resistivity values given as ohms/square
Peel adhesion values given as grams/inch as determined by PSTC 1.

The adhesive film of the present invention may be used with advantage in a variety of applications. Of course, as discussed at length above, the film may be used with advantage in the dicing of semiconductor wafers without need of post-dicing curing or pattern curing. The film may also be used as a protective lamination for glass surfaces that require an ultra clean surface (such as computer monitor screens). It has also been found that the adhesive film may be used with advantage on surfaces that are generally difficult to adhere to, such as Teflon gasket materials.

What is claimed is:

1. A radiation-cured adhesive film comprising a backing layer having coated thereon an adhesive copolymer layer, said copolymer comprised of the copolymerization reaction product of one or more urethane oligomers A, at least one macromer C having a molecular weight of from 300 to 50,000 and defined by the formula X—(Y)$_p$—Z—R where X is a moiety copolymerizable with said urethane oligomer or capable of attachment to said copolymerized components A, B and C, Y is a divalent linking group, Z is a hydrophilic homo- or copolymeric moiety, R is a terminal group, and p is 0 or 1, and optionally one or more non-macromeric B monomers, said adhesive layer having a first surface portion in contact with said backing layer and having a second opposing surface portion not in contact with the backing layer, and the ratio of the average peel adhesion values of said first and second surface portions being at least 2:1, respectively.

2. The adhesive film of claim 1 wherein said oligomer is present in an amount in the range of from 30 to 65 percent by weight based on the total weight of components A, B and C.

3. The adhesive film of claim 1 wherein said macromer is present in an amount in the range of from 35 to 70 percent by weight based on the total weight of components A, B and C.

4. The adhesive film of claim 1 wherein said second surface portion of said adhesive exhibits an average peel adhesive value ranging from 15 to 120 g/in.

5. The adhesive film of claim 1 wherein Z is —(O—C$_m$H$_{2m}$)$_n$— and wherein m is an integer of from 2 to 6 and n is an integer of from 5 to 300.

6. The adhesive film of claim 1 wherein X is a (meth) acrylate moiety.

7. The adhesive film of claim 1 wherein Z is selected from the group consisting of a polyalkylene oxide radical, a polyethyloxazoline radical, a polyacrylic acid radical, a polyvinylalcohol radical, a polyvinylpyrrolidone radical, a polyvinylcaprolactam radical and a polymethylvinyl ether radical.

8. The adhesive film of claim 1 where the macromer is defined by the formula

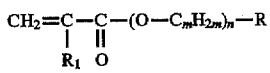

wherein R$_1$ is hydrogen or C$_{1-5}$ alkyl and R is a terminal group; m is an integer of from 2 to 6 and n is an integer of from 5 to 300.

9. The adhesive film of claim 8 wherein R is OH, C$_{1-5}$ alkyl, phenyl or substituted phenyl.

10. The adhesive film of claim 8 wherein said macromer is selected from the group consisting of ethoxylated hydroxyethyl meth(acrylate) and ethoxylated hydroxypropyl (meth)acrylate.

11. The adhesive film of claim 1 wherein said B monomer has a T$_g$ of >20° C. and is hydrophilic.

12. The adhesive film of claim 1 wherein said B monomer is a water-soluble vinyl monomer having at least one nitrogen atom.

13. The adhesive film of claim 1 wherein said B monomer is selected from the group consisting of N-mono-substituted acrylamides, N,N-disubstituted acrylamides and mixtures thereof.

14. The adhesive film of claim 1 wherein X is a (meth) acrylate moiety.

15. The adhesive film of claim 1 wherein said macromer is selected from the group consisting of ethoxylated hydroxyalkyl meth(acrylate), 2-ethyl-2-oxazoline, polyacrylic acid, polyvinyl alcohol, polyvinylpyrrolidone, polyvinyl caprolactam and polymethylvinyl ether mono(meth) acrylate.

16. The adhesive film of claim 1 wherein a B monomer is present which comprises a monomeric acrylic or methacrylic acid ester of a non-tertiary alcohol having from 4–12 carbon atoms on average.

17. The adhesive film of claim 1 wherein said B monomer is a vinyl monomer selected from the group consisting of (meth)acrylic acid, methoxyethyl (meth)acrylate, ethyoxyethyl (meth)acrylate, 2,2(ethoxyethoxy)ethyl acrylate methyl (meth)acrylate, ethyl (meth)acrylate, propyl (meth)acrylate, n-butyl (meth)acrylate, vinyl pyrrolidone, vinyl caprolactam and mixtures thereof.

18. The adhesive film of claim 1 wherein said macromer is defined by the formula:

$$X-(Y)_p-(O-C_mH_{2m})_n-R$$

wherein X is a moiety copolymerizable with oligomer A or capable of attachment to copolymerized components A, B and C, Y is a divalent linking group, R is a terminal group, m is an integer of from 2 to 6, n is an integer of from 5 to 300, and p is 0 or 1.

19. The adhesive film of claim 1 wherein said first surface portion of said adhesive layer exhibits an average peel adhesion of at least 120 g/in as determined by PSTC 1.

20. The adhesive film of claim 1 wherein said backing layer is a release liner.

* * * * *